(12) United States Patent
Pennal

(10) Patent No.: US 7,815,210 B1
(45) Date of Patent: Oct. 19, 2010

(54) TRAILER HITCH ASSEMBLY

(76) Inventor: Eric D. Pennal, 677 31 Rd., Grand Junction, CO (US) 81504

( * ) Notice: Subject to any disclaimer, the term of this patent is extended or adjusted under 35 U.S.C. 154(b) by 170 days.

(21) Appl. No.: 12/013,125

(22) Filed: Jan. 11, 2008

Related U.S. Application Data

(60) Provisional application No. 60/884,875, filed on Jan. 13, 2007.

(51) Int. Cl.
*B60D 1/58* (2006.01)
(52) U.S. Cl. .................................. 280/457; 280/491.5
(58) Field of Classification Search ................. 280/457, 280/495, 497, 491.5, 501
See application file for complete search history.

(56) References Cited

U.S. PATENT DOCUMENTS 3,462,173 A * 8/1969 Bock .......................... 280/484
3,633,939 A 1/1972 Evernham et al.
3,649,049 A * 3/1972 Woodke, III ................. 280/502
4,053,174 A 10/1977 Guettler, Jr.
6,443,474 B1 * 9/2002 Kay ........................... 280/457
6,629,701 B1 10/2003 Colibert
6,722,682 B2 4/2004 Valliere et al.
6,860,501 B2 3/2005 Schmidt et al.
7,025,370 B2 4/2006 Anderson et al.

* cited by examiner

*Primary Examiner*—Kevin Hurley
(74) *Attorney, Agent, or Firm*—Crossley Patent Law; Mark A. Crossley

(57) ABSTRACT

The present trailer hitch assembly addresses the problem of lost tongue weight support and towing capacity when a person adds an extension to a trailer hitch for adding a slide-in camper to a truck or for moving a trailer back a little to increase the turning radius. Generally, when such an extension is utilized, the towing capacity of the vehicle to which the extension is attached is downgraded, due to the lengthening of the overall trailer hitch assembly and lack of structural support. Disclosed herein is a trailer hitch assembly that addresses this problem by providing extra structural support to boost this lack of structural support.

10 Claims, 6 Drawing Sheets

TRAILER HITCH ASSEMBLY

CROSS-REFERENCE TO RELATED APPLICATIONS

U.S. Provisional Application No. 60/884,875 filed on Jan. 13, 2007

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

The present trailer hitch assembly provides an improved receiver hitch having an extension for increasing tongue weight and trailer capacity.

SUMMARY OF THE INVENTION

The present trailer hitch assembly addresses the problem of lost tongue weight support and towing capacity when a person adds an extension to a trailer hitch for adding a slide-in camper to a truck or for moving a trailer back a little to increase the turning radius. A 12" extension decreases tongue weight and trailer capacity by one-half. For example, a five-hundred pound (500 lb.) tongue or five-thousand pound (5,000 lb.) trailer capacity is reduced to a two-hundred fifty pounds (250 lb.) tongue or two thousand five hundred pound (2,500 lb.) trailer capacity, respectively. Yet the trailer capacity is questionable for even a couple of 4-wheelers or an eighteen foot (18') boat, which is within the safety guidelines provided with the extension. Sometimes a driver risks adding an extension to a trailer hitch, hooks up the trailer, and heads down the road, hoping to make it safely to the driver's destination. Sometimes the option chosen is to live with a trailer that one is unable to accurately turn, resulting in the inability to back out a trailer because of safety concerns. In the past one could choose to either risk the extension to get the space needed, or to add an extension to the trailer coupling to achieve the required separation. While adding an extension to a single trailer is not tremendously expensive, many trailer owners have multiple trailers, such as boat trailer, camper trailer, and a 4-wheeler trailer and other types of trailers. Adding extensions to multiple trailers is a rather expensive endeavor. In addition, adding an extension to a borrowed trailer is impractical and cost-prohibitive.

The present trailer hitch assembly addresses these problems by adding an extension to a vehicle hitch which, in essence, creates a small lever beyond the design point of the conventional receiver hitch system. The lever increases the strain on the hitches attachment to the vehicle frame. The longer the extension, the more the strain. Even the backyard mechanic understands the theory that while a ratchet alone might not be able to free a nut, a 2' foot "cheater bar" on the end of that ratchet can be used to free the nut more easily. Comparatively, when adding an extension (cheater) onto a conventional vehicle hitch, the longer the extension is, the more the strain is on the trailer hitch assembly, resulting in a loss in weight capacity with the use of an extension. Since the rated capacity of the hitch system is not changed, the amount of force created by the lever (cheater) is increased and the trailer then has to "decrease" the amount of force it applies to the lever to maintain a safe towing system. However, the present trailer hitch assembly is adjustable and reclaims the described lost towing capacity, and transfers it back to the unused trailer capacity of the tow vehicles bumper. By regaining lost capacity, a user can safely move the trailer attachment a little farther back, without sacrificing the original towing rating of the non-extended tow hitch. By adding the device properly to the extension, and then attaching the adjustable support straps across the top of the vehicle's bumper, capacity is regained and restores the towing capacity lost by adding only an extension. The capacity of the hitch cannot exceed the original rated classification; however, a user of the present trailer hitch assembly regains the capacity which would otherwise have been lost by utilizing just the hitch extension alone. The present trailer hitch assembly adds an adjustable support to the original hitch pin insertion point, and then supports the lost weight across the top of the bumper.

Utilizing the present trailer hitch assembly, once a receiver hitch is installed, the original towing capacity of the bumper is unused and ignored. The receiver hitch itself is installed below the bumper, and physically attaches to the vehicle frame. The trailer hitch assembly enables a portion of the trailer weights to be re-distributed to the previously unused, and ignored, area of the vehicle. The adjustable strap and the hooks allow a user to go across the top of the bumper, and hook onto the frame itself, or catch the back of the bumper at the point where the bumper support bracket meets the bumper. On a newer style vehicle where there is no access above and behind the bumper the top, a secondary bracket may be installed at the point where the original tow ball and tow chain attachment locations are. In another embodiment, this secondary bracket attaches differently depending upon the specific make and model of vehicle.

There has thus been outlined, rather broadly, the more important features of a trailer hitch assembly that the detailed description thereof that follows may be better understood and in order that the present contribution to the art may be better appreciated. There are, of course, additional features of the trailer hitch assembly that will be described hereinafter and which will form the subject matter of the claims appended hereto.

In this respect, before explaining at least one embodiment of the trailer hitch assembly in detail, it is to be understood that the trailer hitch assembly is not limited in its application to the details of construction and to the arrangements of the components set forth in the following description or illustrated in the drawings. The trailer hitch assembly is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the trailer hitch assembly. It is important, therefore, that the claims be regarded as including such equivalent constructions insofar as they do not depart from the spirit and scope of the present invention.

It is therefore an object of the present invention to provide a trailer hitch assembly which has all of the advantages of the prior art and none of the disadvantages.

It is another object of the present invention to provide a trailer hitch assembly which may be easily and efficiently manufactured and marketed.

It is another object of the present invention to provide a trailer hitch assembly which is of durable and reliable construction.

It is yet another object of the present invention to provide a trailer hitch assembly which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

With reference now to the drawings, and in particular FIGS. 1 through 10 thereof, the principles and concepts of the present trailer hitch assembly generally designated by the reference number 2 will be described.

Figure 1:
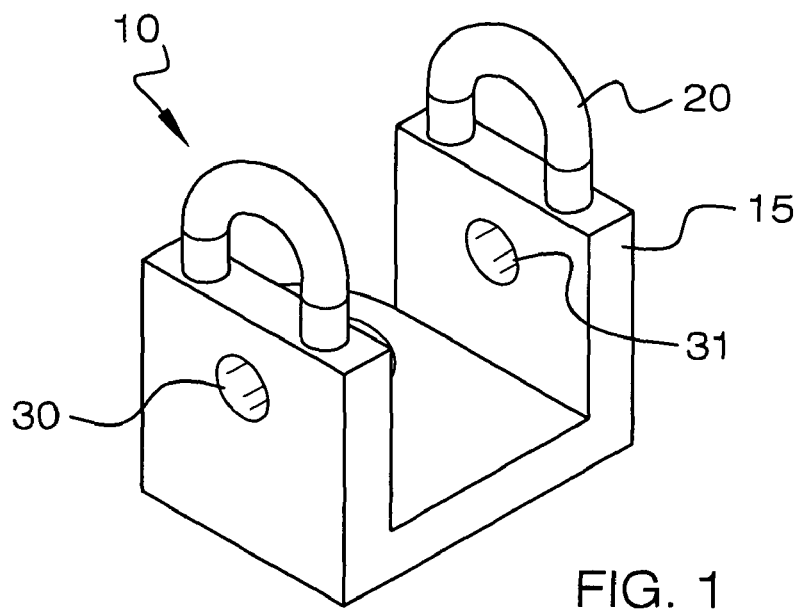
FIG. 1 is a front isometric view of a receiver hitch.
Figure 2:
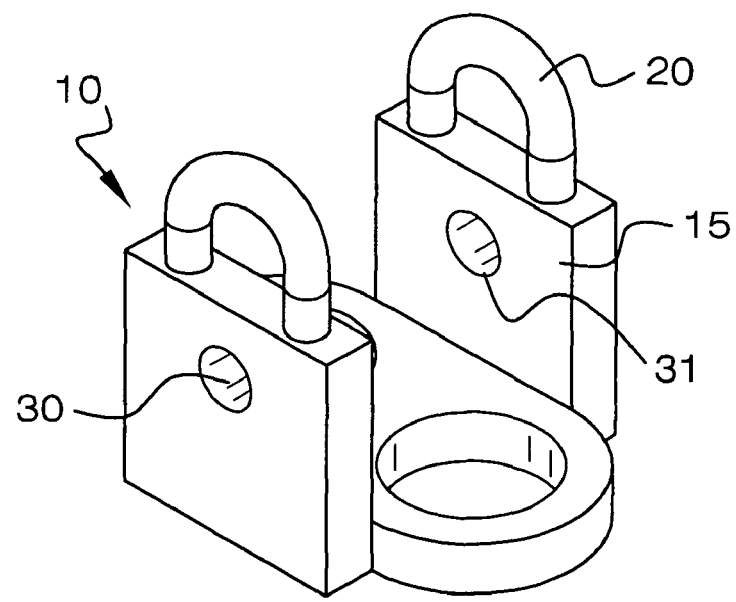
FIG. 2 is a rear isometric view of a receiver hitch.
Figure 3:
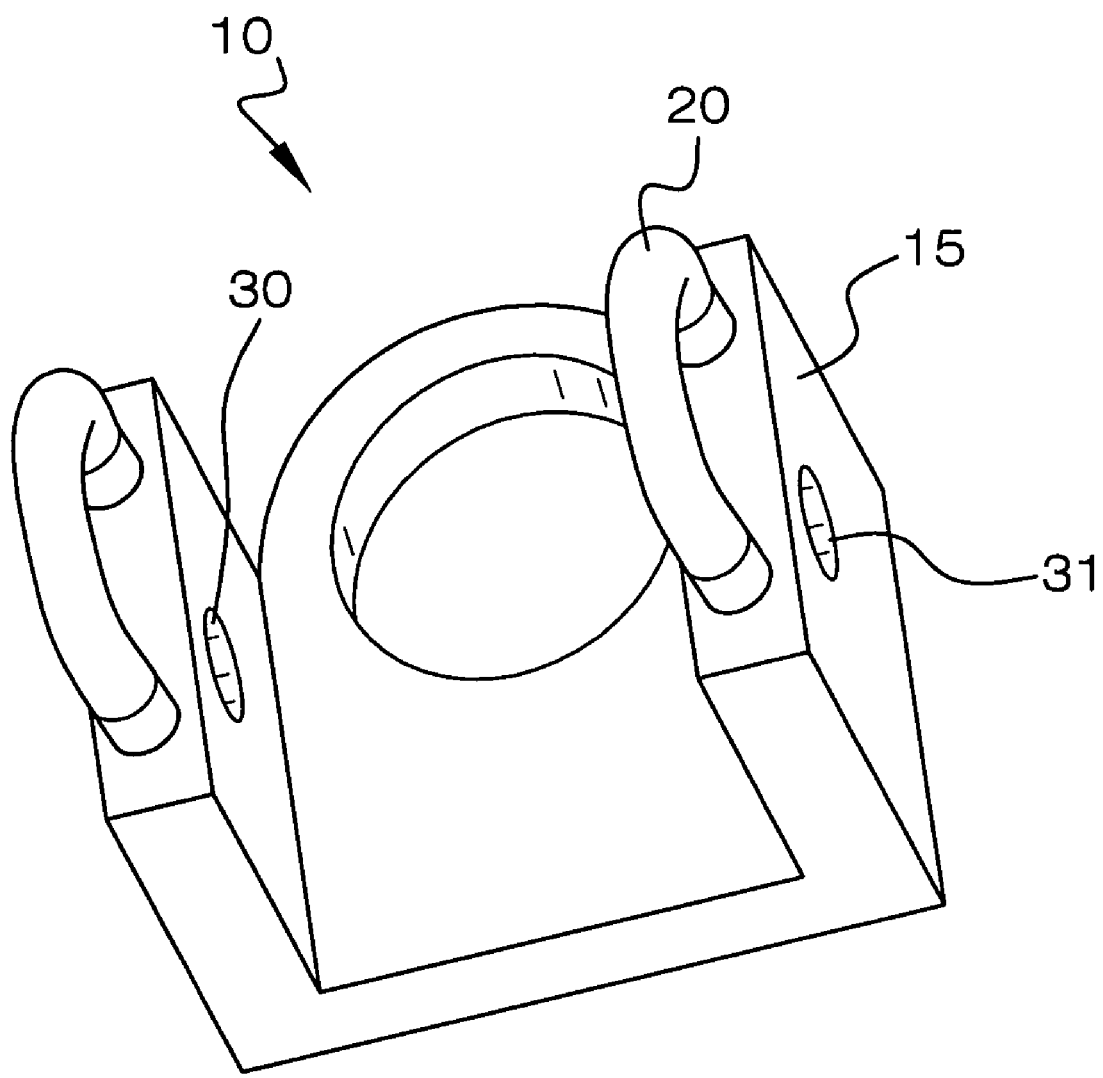
FIG. 3 is a top isometric view of a receiver hitch.

Referring to FIGS. 1, 2 and 3, the present trailer hitch assembly 2 comprises a generally U-shaped receiver hitch 10 formed of a heavy construction material, such as thick steel. The receiver hitch 10 has a U-shaped base member 15 that includes a base 17 that has two ends comprising a left end and a right end, with a right upright 18 attached to the right end of the base 17 and a left upright 19 attached to the left end of the base 17. Each of the uprights 18 and 19 has a top end. The base member 15 further includes a pair of semi-circular shaped brackets 20, each of which is attached to one of the top ends of the base member 15. Furthermore, the receiver hitch 15 has a pair of apertures 30 and 31, with aperture 30 located on the right upright 18 and aperture 31 located on the left upright 19.

Figure 4:
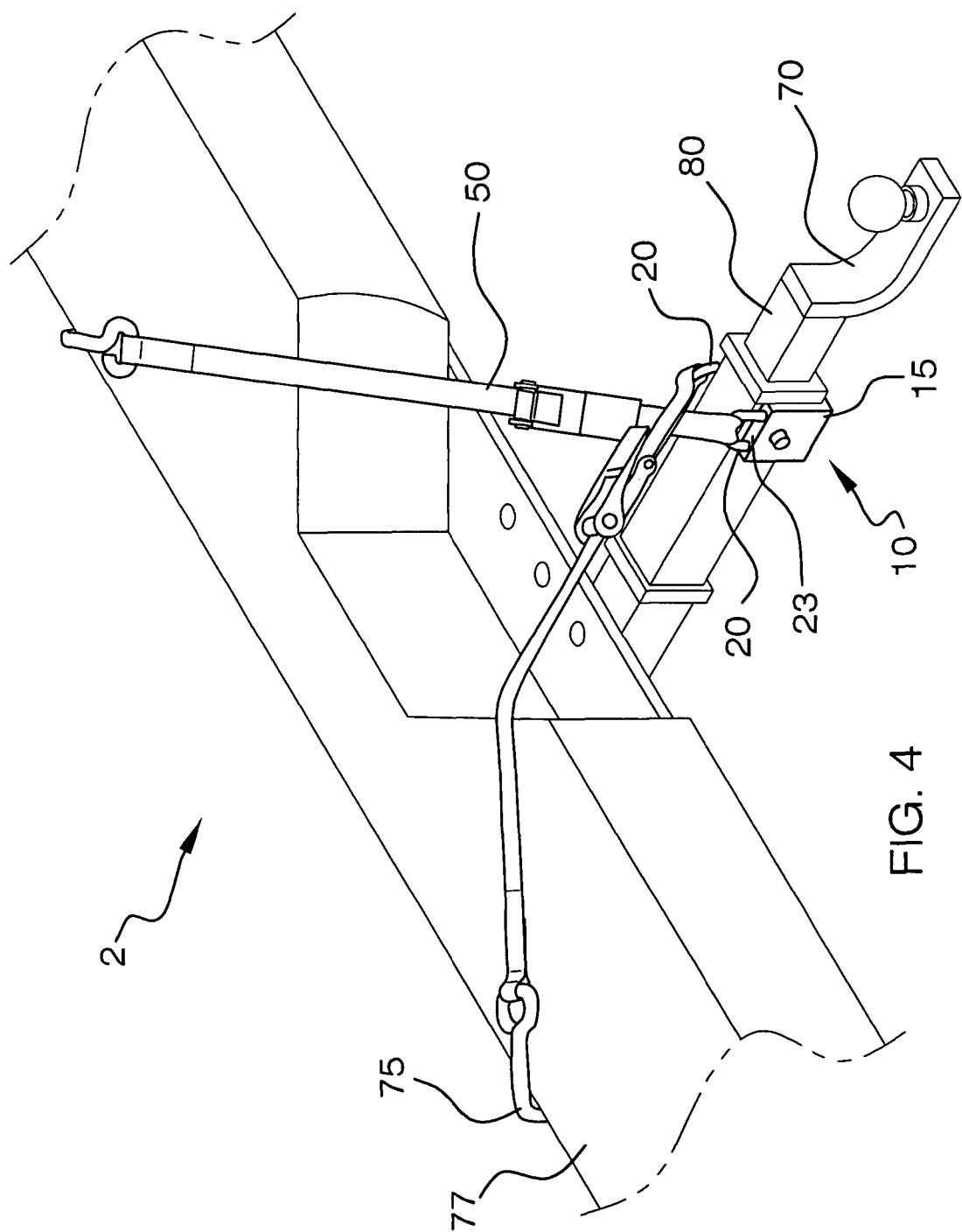
FIG. 4 is an in-use left side elevational view of the present trailer hitch assembly installed on a vehicle hitch.
Figure 5:
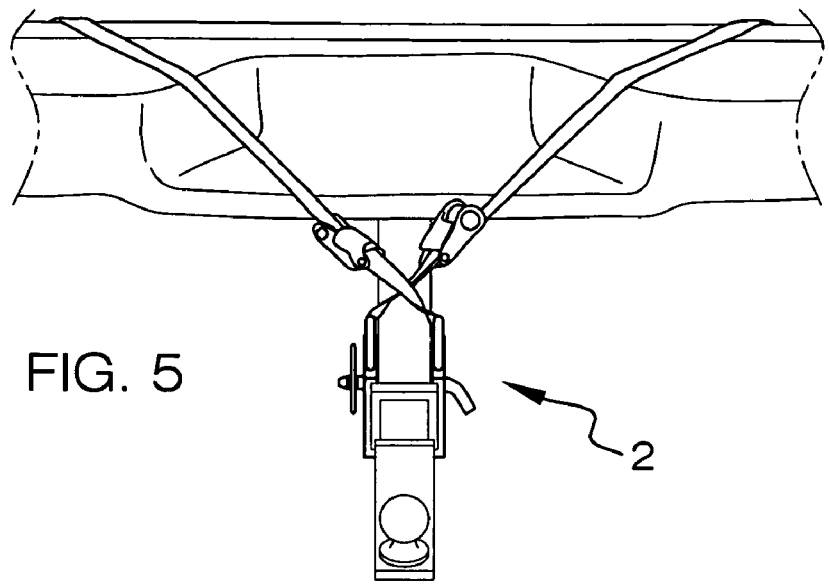
FIG. 5 is an in-use front isometric view of the present trailer hitch assembly installed on a vehicle hitch.
Figure 6:
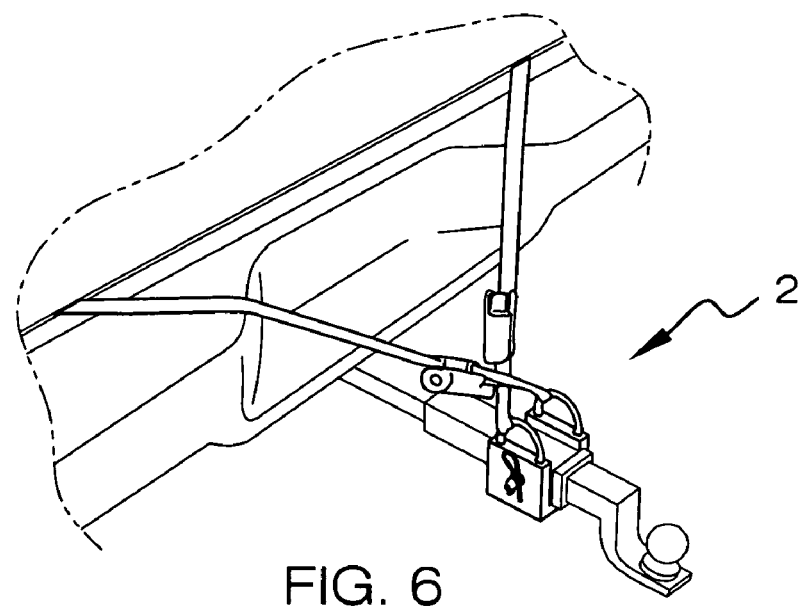
FIG. 6 is a left side isometric view of the present trailer hitch assembly installed on a vehicle hitch.
Figure 7:
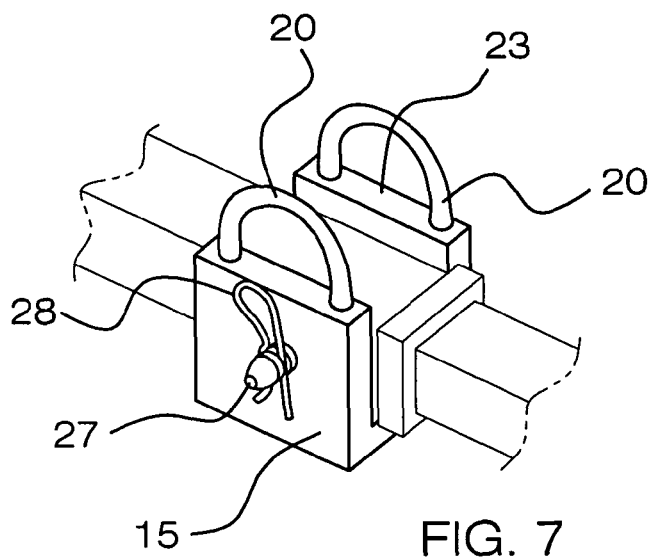
FIG. 7 is a left side isometric view of a strap assembly attached to a receiver hitch.
Figure 8:
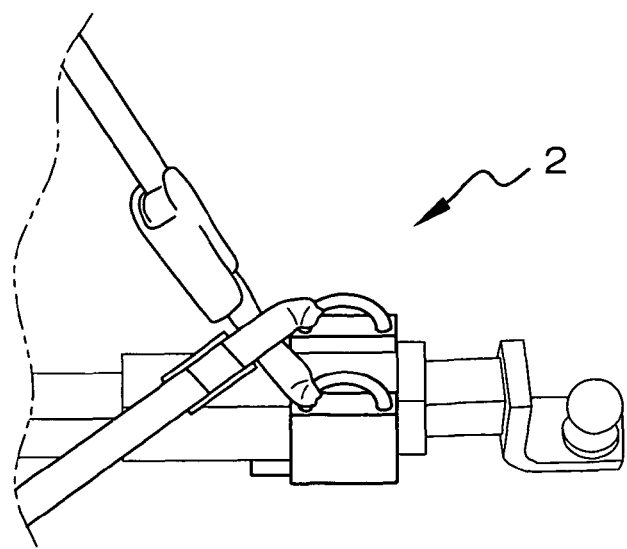
FIG. 8 is a left side isometric view of a strap assembly attached to a receiver hitch.
Figure 9:
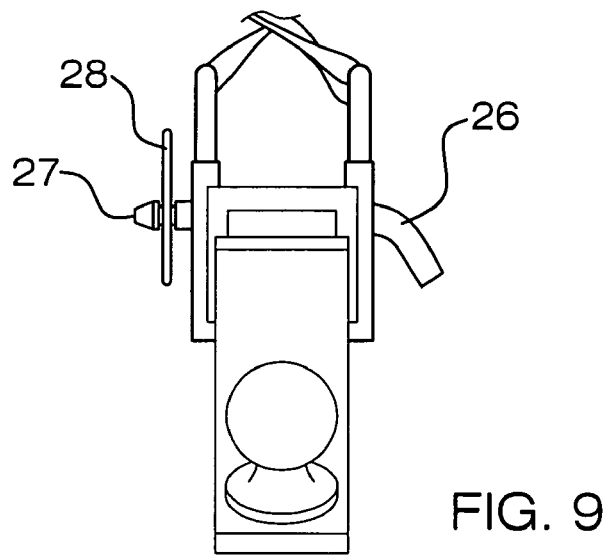
FIG. 9 is a front elevation of a receiver hitch attached to a vehicle hitch illustrating attachment of a strap assembly to such receiver hitch.
Figure 10:
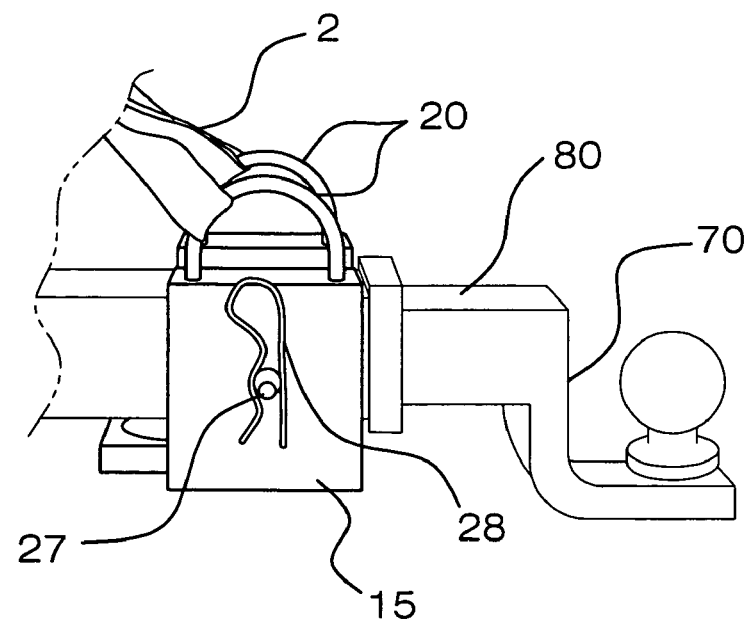
FIG. 10 is a left elevation view of a receiver hitch attached to a vehicle hitch.

Viewing FIG. 4, the present trailer hitch assembly 2 is illustrated. Shown is a receiver hitch 10 attached to an extension 80 on a conventional vehicle hitch 70. The extension 80 itself is attached to the primary vehicle hitch 5, which itself is attached to the vehicle bumper 75 or vehicle frame 77. Said vehicle hitch 70 does not form part of the claimed invention and is shown for illustrative purposes only. Said receiver hitch 10 is attached to said vehicle with said brackets 20 pointing in an upwardly direction from said base member 15.

As shown in FIGS. 4, 5, 6, 7, 8, 9 and 10, once the receiver hitch 10 is in proper position, a shank 25 having an angled end 26 and a head end 27 having a hole 35 is placed through the apertures 30, 31 of said base member 15. A cotter pin 28 is placed through said hole 35 of said head end 27. A strap assembly 50 comprises first strap 51 and second strap 52, each of which has two ends comprising a first end and a second end. The first end of each of the straps 51, 52 has a hook 55 attached to it, while the second end of each strap is tied to one of the semi-circular shaped brackets 20 on the U-shaped base member 15. Each of the hooks 55 is attached to either the bumper 75 or the frame 77 of the vehicle 90. While each of the straps 51, 52 travel from the point of attachment with the vehicle to the respective semi-circular shaped brackets 20, the straps 51, 52 cross one another, thereby providing additional structural support.

By attaching the receiver hitch 10 properly to an extension 80 to a conventional vehicle hitch 70, and then running a portion of the adjustable support strap assembly 50 and attaching said strap assembly via hooks 55 across the top of the vehicle's bumper 75 or frame 77, weight capacity for towing is regained and restores the capacity which would otherwise be lost by utilizing only an extension 80. While the capacity of the vehicle hitch 70 cannot exceed the original rated classification, a user of the present trailer hitch assembly 2 regains the towing capacity which would otherwise have been lost by utilizing just the hitch extension 80 alone. The present trailer hitch assembly 2 adds an adjustable support to the original hitch pin insertion point, and then supports the lost weight across the top of the bumper 75.

Utilizing the present trailer hitch assembly 2, once a receiver hitch 10 is installed, the original towing capacity of the bumper is unused and ignored. The receiver hitch 10 itself is installed below the bumper 75, and physically attaches to the vehicle frame. The trailer hitch assembly 2 enables a portion of the trailer weights to be re-distributed to the previously unused, and ignored, area of the vehicle. The adjustable strap assembly 50 and the hooks 55 allow a user to provide further support by going across the top of the bumper 75, and hooking the hooks onto vehicle frame 77 itself, or catch the back of the bumper at the point where the bumper support bracket meets the bumper 75. On a newer style vehicle where there is no access above and behind the bumper the top, a secondary bracket may be installed at the point where the original tow ball and tow chain attachment locations are. In another embodiment, this secondary bracket attaches differently depending upon the specific make and model of vehicle.

With respect to the above description then, it is to be realized that the optimum dimensional relationships for the parts of the present trailer hitch assembly, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the trailer hitch assembly.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the trailer hitch assembly may be used.

Therefore, the foregoing is considered as illustrative only of the principles of the trailer hitch assembly. Further, since numerous modifications and changes will readily occur to those skilled in the art, it is not desired to limit the adjustable gutter hanger apparatus to the exact construction and operation shown and described, and accordingly, all suitable modifications and equivalents may be resorted to, falling within the scope of the trailer hitch assembly.

What I claim as my invention is:

1. A trailer hitch assembly in combination with a vehicle, the vehicle including a frame, the vehicle also including a bumper, the assembly comprising
    a primary hitch attached to the vehicle;
    an extension attached to the primary hitch;
    a base, the base having two ends comprising a first end and a second end,
    a pair of extensions comprising a left extension and a right extension, the left extension being attached to the first end of the base, the right extension being attached to the second end of the base, each of the extensions having a top end,
    a pair of semi-circular shaped brackets, wherein one semi-circular bracket is attached to the top end of each of the extensions of the pair of extensions,
    an opening located in between the left extension and the right extension.

2. A trailer hitch assembly in combination with a vehicle according to claim 1 further comprising
    (a) a pair of apertures comprising a first aperture and a second aperture, the first aperture being located on the left extension, the second aperture being located on the right extension,
    (b) a shank, the shank having two ends comprising a head end and an angled head,
    (c) wherein the extension attached to the primary hitch is placed within the opening located in between the left extension and the right extension,
    (d) further wherein the shank is placed through each of the apertures of the pair of apertures and through the extension.

3. A trailer hitch assembly in combination with a vehicle according to claim 2 further comprising
    (a) a hole in the shank located near the head end of the shank,
    (b) a cotter pin,
    (c) wherein the cotter pin is inserted through the hole in the shank upon placement of the shank through each of the apertures and through the extension.

4. A trailer hitch assembly in combination with a vehicle according to claim 3 further comprising
    (a) a pair of straps comprising a first strap and a second strap, wherein each of the straps has two ends comprising a first end and a second end,
    (b) a pair of hooks, wherein one hook is attached to the first end of each strap of the pair of straps, further wherein each hook is attached to a portion of the vehicle,
    (c) wherein the second end of each of the straps of the pair of straps is attached to a semi-circular shaped bracket.

5. A trailer hitch assembly in combination with a vehicle according to claim 4 wherein each of the straps, while traveling from the portion of the vehicle to which it is attached to the semi-circular shaped bracket, crosses the other strap.

6. A trailer hitch assembly in combination with a vehicle according to claim 5 wherein the portion of the vehicle to which each hook is attached further comprises the frame of the vehicle.

7. A trailer hitch assembly in combination with a vehicle according to claim 5 wherein the portion of the vehicle to which each hook is attached further comprises the bumper of the vehicle.

8. A trailer hitch assembly in combination with a vehicle, the vehicle including a frame, the vehicle also including a bumper, the assembly comprising
    a primary hitch attached to the vehicle,
    an extension attached to the primary hitch,
    a base, the base having two ends comprising a first end and a second end,
    a pair of extensions comprising a left extension and a right extension, the left extension being attached to the first end of the base, the right extension being attached to the second end of the base, each of the extensions having a top end,
    a pair of semi-circular shaped brackets, wherein one semi-circular bracket is attached to the top end of each of the extensions of the pair of extensions,
    an opening located in between the left extension and the right extension,
    a pair of straps comprising a first strap and a second strap, wherein each of the straps has two ends comprising a first end and a second end,
    a pair of hooks, wherein one hook is attached to the first end of each strap of the pair of straps, further wherein each hook is attached to a portion of the vehicle,
    wherein the second end of each of the straps of the pair of straps is attached to a semi-circular shaped bracket,
    wherein each of the straps, while traveling from the portion of the vehicle to which it is attached to the semi-circular shaped bracket, crosses the other strap,
    a pair of apertures comprising a first aperture and a second aperture, the first aperture being located on the left extension, the second aperture being located on the right extension,
    a shank, the shank having two ends comprising a head end and an angled head,
    wherein the extension attached to the primary hitch is placed within the opening located in between the left extension and the right extension,
    further wherein the shank is placed through each of the apertures of the pair of apertures and through the extension,
    a hole in the shank located near the head end of the shank,
    a cotter pin,
    wherein the cotter pin is inserted through the hole in the shank upon placement of the shank through each of the apertures and through the extension.

9. A trailer hitch assembly in combination with a vehicle according to claim 8 wherein the portion of the vehicle to which each hook is attached further comprises the frame of the vehicle.

10. A trailer hitch assembly in combination with a vehicle according to claim 8 wherein the portion of the vehicle to which each hook is attached further comprises the bumper of the vehicle.

* * * * *